Feb. 16, 1971  R. W. KREWSON  3,563,014
COMBINATION LAWNMOWER AND LEAF RAKE
Filed Feb. 20, 1967  2 Sheets-Sheet 1

INVENTOR
RALPH W. KREWSON
BY
Dueck, Zaily, McKee & Thomte
ATTORNEYS

Feb. 16, 1971  R. W. KREWSON  3,563,014
COMBINATION LAWNMOWER AND LEAF RAKE
Filed Feb. 20, 1967  2 Sheets-Sheet 2

INVENTOR
RALPH W. KREWSON
BY
Zuck, Zarley, McKee & Thomte
ATTORNEYS

United States Patent Office
3,563,014
Patented Feb. 16, 1971

3,563,014
COMBINATION LAWNMOWER AND LEAF RAKE
Ralph W. Krewson, West Des Moines, Iowa
(629 Bompart, Webster Groves, Mo. 63119)
Filed Feb. 20, 1967, Ser. No. 617,408
Int. Cl. A01d 35/26
U.S. Cl. 56—25.4                                    3 Claims

ABSTRACT OF THE DISCLOSURE

A rotary lawnmower and leaf rake including a wheeled housing having a channel-shaped liner therein, a cutting blade means rotatably mounted in the liner and a collection bag structure detachably secured to the housing.

---

Conventional rotary lawnmowers are dangerous to operate in that the rotating metal blade will throw foreign objects struck thereby with a great amount of force. Also, the conventional rotary lawnmowers tend to permit the accumulation of grass cuttings within the housing which greatly reduces the efficiency thereof. The collection bags presently utilized with the rotary lawnmowers are not easily and quickly attachable and detachable with respect to the lawnmower and also, the bag must be maunally emptied of its contents inasmuch as the collection bag is not disposable.

Therefore, it is a principal object of this invention to provide a rotary lawnmower which will not throw objects which are struck by the rotating cutting blade.

A further object of this invention is to provide a rotary lawnmower having means thereon adapted to cause the grass to be lifted upwardly with respect to the rotating cutting blade.

A further object of this invention is to provide a lawnmower having a channel-shaped liner within the wheeled housing which is adapted to greatly reduce the accumulation of grass cuttings therein.

A further object of this invention is to provide a lawnmover having disposable blades of nylon, urethane elastomer, or similar material pivotally secured to a supporting blade means.

A further object of this invention is to provide a lawnmower and leaf rake having a cutting blade means rotatably mounted within a liner which is positioned within the wheeled housing, the cutting blade means having a shape complementary to that of the channel thereby reducing the possibility of foreign objects being thrown from the lawnmower upon coming into contact with the rotating blade.

A further object of this invention is to provide a lawnmower having a collection bag structure which can be quickly and easily secured to and separated from the lawnmower.

A further object of this invention is to provide a disposable collection bag means for a lawnmower.

A further object of this invention is to provide a lawnmower which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figure 1:
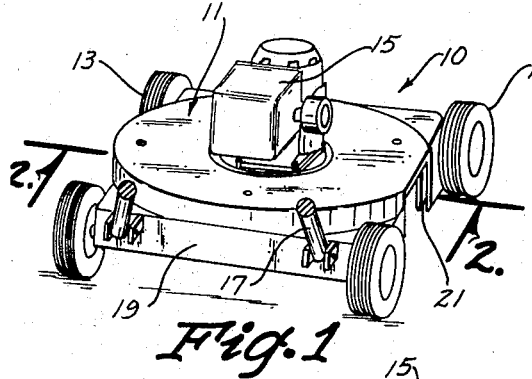
FIG. 1 is a partial rear perspective view of a lawnmower.
Figure 2:
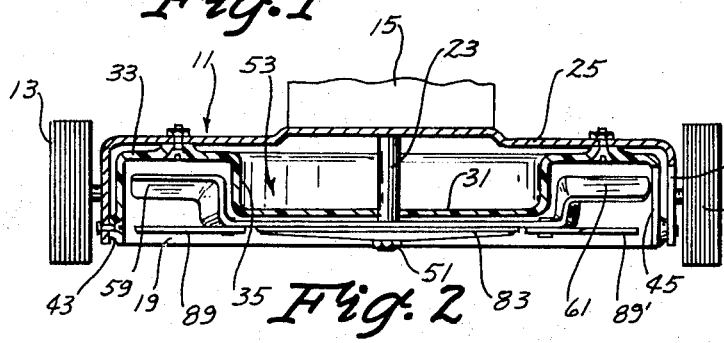
FIG. 2 is an enlarged sectional view of a lawnmower as would be seen on line 2—2 of FIG. 1.

In FIGS. 1 and 2, the numeral 10 generally designates a rotary lawnmower including a blade housing 111 supported by ground engaging wheels 13 and having a power means 15 secured thereto. A handle 17 is pivotally secured to the rearward end 19 of housing 11 and housing 11 is provided with a discharge opening 21 formed in one side thereof. As seen in FIG. 2, power means 15 has a power shaft 23 rotatably extending downwardly through the top 25 of housing 11.

A liner 27 is detachably mounted within housing 11 by bolts 29 and includes a central hub portion 31 and a peripheral channel portion 33 extending therearound. For purposes of description, channel portion 33 will be described as including an inner vertical wall 35, a horizontal top wall 37 and a vertical outer wall 39. Wall 37 is provided with a plurality of protrusions 41 extending upwardly therefrom which are adapted to receive bolts 29 extending therethrough. As seen in FIG. 2, bolts 29 extend through wall 37 and protrusions 41 and the protrusions serve to space wall 37 from the interior of top 25 of housing 11. Wall 39 is provided with a plurality of protrusions 43 extending outwardly therefrom which are adapted to receive bolts 29 extending therethrough. As seen in FIG. 2, bolts 29 extend through wall 39 and protrusions 43 and the protrusions serve to space wall 39 from the downwardly extending flange portion of housing 11. The lower end of wall 39 terminates below the plane of wall 31 and approximately in the same plane as the lower end of the downwardly extending flange of the housing 11. As seen in FIG. 2, shaft 23 freely extends through opening 47 in wall 31 of liner 27. Shaft 23 has threaded reduced diameter portion 49 provided at its lower end which is adapted to receive a nut 51.

Figure 3:
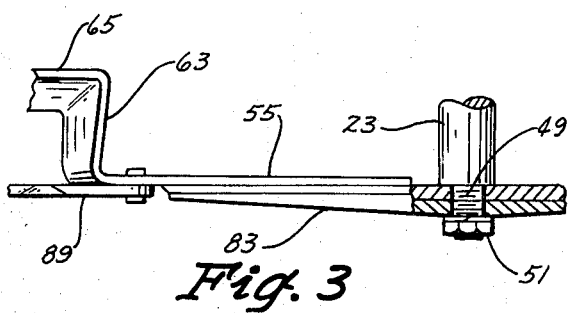
FIG. 3 is an enlarged fragmentary side view of the cutting blade means.
Figure 7:
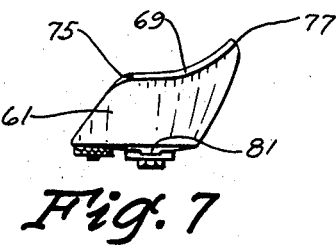
FIG. 7 is an end view of the cutting blade means.
Figure 4:
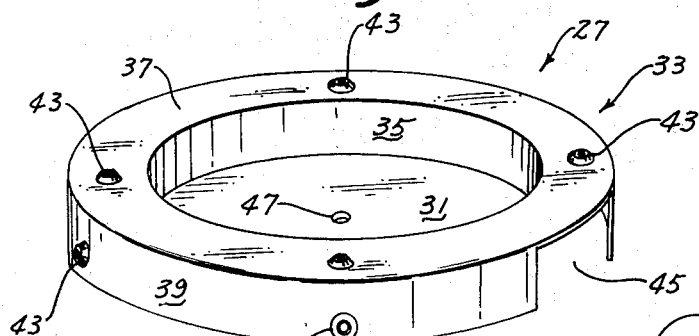
FIG. 4 is a perspective view of the channel-shaped liner.
Figure 5:
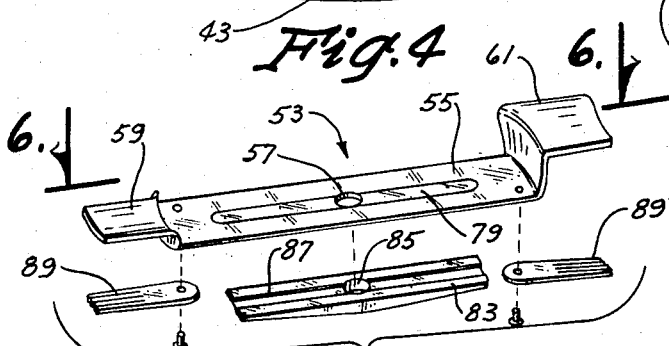
FIG. 5 is an exploded perspective view of the cutting blade means.
Figure 6:
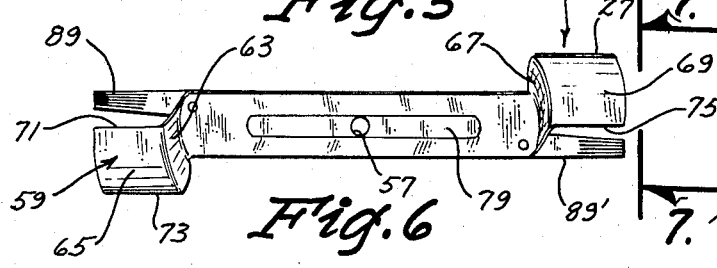
FIG. 6 is a top view of the cutting blade means.

The numeral 53 generally designates a supporting bar and is best seen in FIGS. 2, 3, 5, 6 and 7. As seen in FIG. 5, bar 53 includes a horizontal portion 55 having an opening 57 formed therein which is adapted to receive the threaded portion 49 of shaft 23 as best illustrated in FIG. 3. As seen in FIG. 2, horizontal portion 55 extends across the bottom of the hub portion 31. Bar 53 is provided with inverted L-shaped wings 59 and 61 at the opposite ends thereof which extend upwardly from the ends of horizontal portion 55 to dwell within channel portion 33 defined by walls 35, 37 and 39. Wing 59 includes an arcuate wall member 63 which extends upwardly and slightly laterally with respect to horizontal portion 55 and also includes an arcuate top portion 65 extending outwardly from the upper end of wall 63. Wing 61 includes an arcuate wall member 67 extending upwardly and laterally from the other end of horizontal portion 55 and an arcuate top portion 69 extending outwardly therefrom. The shape of wall 67 and top 69 is best illustrated in FIGS. 5–7. For purposes of description, wing 59 will be described as having a leading edge 71 and a trailing edge 73 while wing 61 will be described as having a leading edge 75 and a trailing edge 77. As shown in FIG. 6, the wings 59 and 61 are swept back with respect to the horizontal portion 55, so that the leading edges 71 and 77 of the respective wings will "trail" the top and bottom edges, respectively (as viewed in FIG. 6) of the horizontal portion 55. This allows grass clippings from cutting blades 89 and 89' (to be described hereafter) to be swept upwardly into the air stream created by the wings. Wings 59 and 61 are identical in configuration and it can be seen in FIG. 7 that top 69 is designed so that the trailing edge 77 is in a plane higher than that of the leading edge 75 to create a lifting air current to pull the grass upwardly when the supporting bar 53 is rotated by the power means 15.

Supporting bar 53 is provided with an elongated recess portion 79 formed in the upper surface of horizontal portion 55 and is provided with an elongated protruding portion 81 extending downwardly from the bottom surface of horizontal portion 55 which is complementary to recess portion 79. An elongated support plate 83 is positioned below supporting bar 53 and has a central opening 85 formed therein which is adapted to receive threaded portion 49 of shaft 23 as best illustrated in FIG. 3. As seen in FIGS. 3 and 5, plate 85 is tapered so as to have a central thickness greater than that of its respective ends. As seen in FIG. 5, the upper portion of plate 83 is provided with an elongated groove 87 formed therein which is adapted to receive protruding portion 81 at the bottom of horizontal portion 55. It is the mating of protruding portion 81 and groove 87 which prevents rotational movement of bar 53 and plate 83 with respect to each other. As seen in FIG. 3, nut 51 securely maintains plate 83 in engagement with the lower surface of horizontal portion 55 of bar 53.

Figure 8:
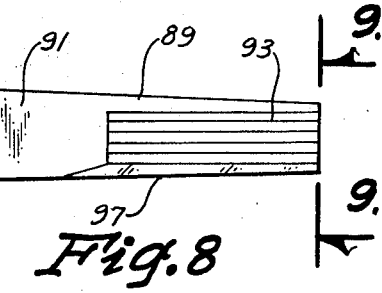
FIG. 8 is a top view of a blade element.
Figure 9:
FIG. 9 is an end view of the blade element of FIG. 8 as would be seen on line 9—9 of FIG. 8.

A pair of cutting blades 89 and 89' are pivotally secured to opposite ends of horizontal portion 55 of bar 53 as indicated in the drawings. Blades 89 and 89' may be secured to the bar 53 by means of rivets or bolt assemblies. It can be seen in FIG. 6 that the blades are secured to bar 53 so that the leading cutting edges thereof are substantially aligned with the edge of the horizontal portion 55 and the cutting edges are ahead of the leading edges 71 and 75 of wings 89 and 89', respectively. Inasmuch as blades 89 and 89' are identical, only blade 89 will be described in detail. The blade 89 is best illustrated in FIGS. 8 and 9 and is preferably constructed of a resilient material such as nylon, urethane elastomer, or the like. As seen in FIGS. 8 and 9, blade 89 includes a body portion 91 and a cutting portion 93. Cutting portion 93 is comprised of a plurality of angularly disposed ribs 95. Blade 89 is provided with a cutting edge 97 on the forwardmost rib 95 as best illustrated in FIG. 9. Preferably, the thickness of the extreme end of body portion 91 is 3/16 of an inch while the thickness at the other end of the cutting blade is preferably 1/8 of an inch.

In operation, power means 15 is activated to cause the rotation of shaft 23 which causes the rotation of bar 53, blades 89 and 89', and bar 85 in a clockwise direction as viewed in FIGS. 5 and 6. The wings 59 and 61 are arcuate in shape as previously described and their sole function is to create a lifting air current to pull the grass and the grass clippings upwardly. It should be noted that the general shape of bar 53 is complementary to the lower cross-sectional shape of the liner 27, and the purpose of this complementary shape is to prevent the bar from having an opportunity to obtain good leverage on any object that it might hit. For example, it would be doubtful that a tin can having a height sufficient to reach the top of the channel 33 would ever be encountered, but if this were the case, the tin can would be struck at its upper end which would impart less velocity to the tin can than if it were hit at its mid-section. It would be impossible for a tin can to be hit by the horizontal portion 55 of the bar 53, and any foreign object having a reduced clearance sufficient to engage the horizontal portion 55 of the bar 53 (such as a walnut or the like) would be struck at its top in the manner described above thereby imparting less velocity to such object. It can be appreciated that a close complementary condition of the hub portion 31 with respect to the horizontal portion 55 does prevent the horizontal portion 55 from striking a foreign object at any position other than the extreme upper portion thereof. Because the wings 59 and 61 are substantially elevated from the ground surface, the suction or "lift" created thereby are less likely to pick up small pieces of gravel or the like than if the wings were at the lower elevation of cutting blades 89 and 89'.

The nylon cutting blades are disposable and the configuration of the angularly disposed ribs 95 will always present a substantially sharp leading cutting edge 97 regardless of the wear thereupon. This relationship can perhaps be best visualized in FIG. 9 wherein it can be seen that the cutting edge 97 will continue to wear to the right as viewed in FIG. 9 thereby providing a substantially sharp leading cutting edge. Additionally, the resilient construction of the blades 89 and 89' causes the blades to have less mass than a blade of equal size and shape constructed of other material, whereupon it imposes less centrifugal force to any object that is struck. In addition, the resilient blades deflect more easily than would a metal blade, so that some of the impact of foreign objects being struck thereby is absorbed by the blade, and this reduces the impact imposed on the foreign objects struck. The blades are heavy enough and stiff enough only to cut grass, and will yield and deflect when more solid objects are encountered.

Preferably, the liner 27 is constructed of a flexible polyethylene material which greatly reduces the tendency of grass cuttings to accumulate thereon. The waxy material of the polyethylene liner also tends to prevent the accumulation of grass cuttings thereon. Additionally, the protrusions 41 and 43 cause a direct contact to be established with the housing 11 of the mower but the top and side walls of the liner will be held in substantial equal relation to the housing. Housing 11 will cause liner 27 to vibrate during the operation thereof and this vibration also tends to prevent grass cuttings from sticking thereto.

Figure 10:
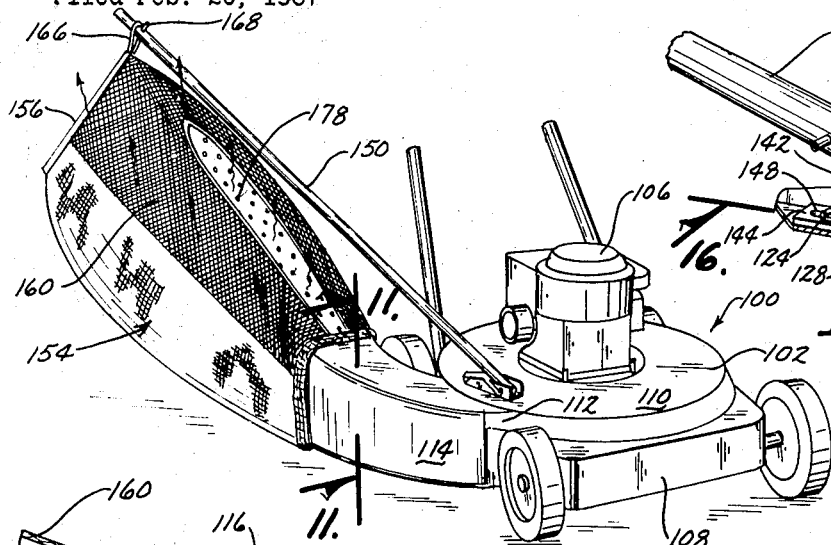
FIG. 10 is a front perspective view of a lawnmower having the collection bag means detachably secured thereto.
Figure 11:
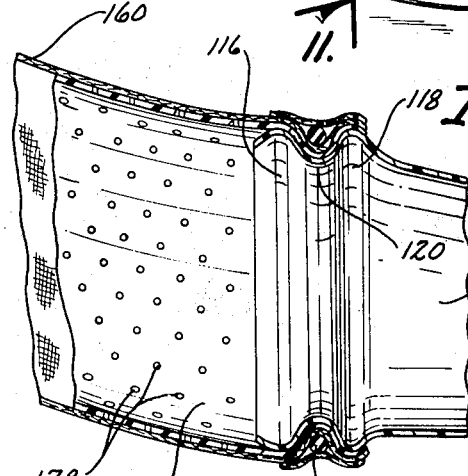
FIG. 11 is an enlarged sectional view as would be seen on line 11—11 of FIG. 10.

In FIG. 10, the numeral 100 designates a rotary lawnmower including a blade housing 102 supported by ground engaging wheels 104 and powered by a power means 106. For purposes of description, housing 102 will be described as having a forward end 108, a top 110 and a discharge side 112. A discharge chute 114 is detachably secured to housing 102 at discharge side 112 so as to enclose the discharge opening formed in the housing 102 at discharge side 112. As seen in FIG. 10, chute 114 extends outwardly, rearwardly and upwardly with respect to the housing. The rearward end of chute 114 is substantially square in cross-section but could be round if desired. As seen in FIG. 11, the rearward end of chute 114 is provided with a pair of peripheral ridges 116 having a peripheral groove 120 formed therebetween.

Figure 15:
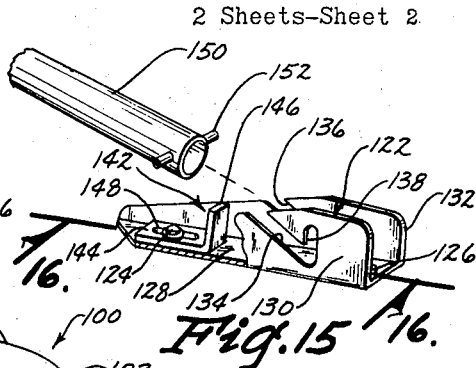
FIG. 15 is a fragmentary perspective view of the collection bag supporting arm and the bracket which is secured to the lawnmower housing.
Figure 16:
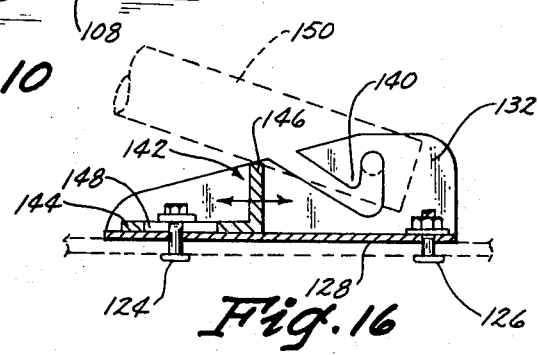
FIG. 16 is a sectional view as would be seen on line 16—16 of FIG. 15, the broken lines indicating the position of the end of the collection bag supporting arm when the same is received within the bracket.

The numeral 122 generally designates a U-shaped bracket which is detachably secured to top 110 of housing 102 by means of bolts 124 and 126 (FIG. 16). Bracket 122 includes a base portion 128 and opposite upstanding sides 130 and 132. As seen in FIG. 15, sides 130 and 132 are provided with slots 134 and 136 formed therein. As seen in the drawings, slots 134 and 136 are shaped so as to define shoulder portions 138 and 140. An angular slide 142 comprised of a horizontal portion 144 and a vertical portion 146 is slidably mounted on base portion 128 by means of bolt 124 extending through elongated slot 148 in horizontal portion 144. The numeral 150 designates an elongated bag supporting arm having a pin means 152 extending through its forward end and protruding from opposite sides thereof. Arm 150 is detachably connected to bracket 122 by simply inserting the end of arm 150 between sides 130 and 132 so that te protruding ends of pin 152 is received in slots 134 and 136 respectively. Arm 150 is moved until pin 152 is in the extreme upper ends of slots 134 and 136 so that shoulders 138 and 140 are rearwardly of the pin as illustrated in FIG. 16. Slide 142 maintains pin 152 in slots 134 and 136 in the manner illustrated in FIG. 16 due to the engagement of the upper end of vertical portion 146 and arm 150. Thus, arm 150 tends to pivot about the upper end of vertical portion 146 thereby causing pin 152 to maintain pin 152 within slots 134 and 136. The angle of arm 150 with respect to the lawnmower may be varied by simply sliding slide 142 either towards or away from slots 134 and 136 which will necessarily change the point of contact between arm 150 and the upper end of vertical portion 146.

Figure 12:
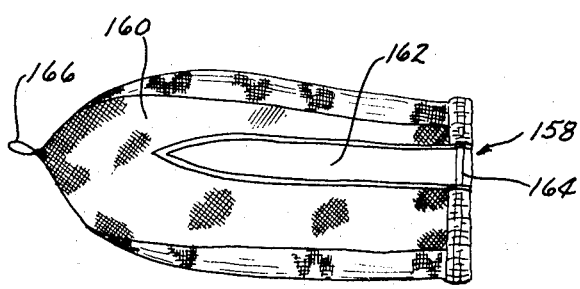
FIG. 12 is a top view of the carrier bag portion of the collection bag means.

The numeral 154 designates a carrier bag having a closed rearward end 156 and an open forward end 158. Bag 154 is constructed of a fabric material and has an insert 160 provided therein which is of a net or loosely woven construction. It can be seen in FIGS. 10 and 12 that insert 160 is provided with an opening 162 formed therein which extends rearwardly from the open end of the carrier bag. A circular elastic band 164 is sewn into the bag 154 adjacent its open end as best seen in FIG. 11. Bag 154 is provided with a loop 166 at its rearward end which is adapted to extend over the upper end of arm 150 and is limited in its downward movement with respect thereto by pin 168 in arm 150. Bag 154 is detachably mounted on the rearward end of chute 114 with elastic 164 being received within groove 120.

Figure 13:
FIG. 13 is a plan view of a fabric collection bag which is adapted to be received within the carrier bag of FIG. 12 at times.
Figure 14:
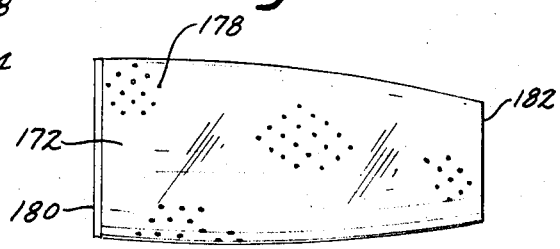
FIG. 14 is a plan view of a perforated plastic bag which is adapted to be received within the carrier bag of FIG. 12 at times.

The bag 154 is adapted to receive either the bag 170 which is seen in FIG. 13 or the bag 172 which is seen in FIG. 14. Bag 170 is constructed of a fabric material such as muslin or the like and has its rearward end 174 sealed by sewing or the like. The forward end 176 of bag 70 is open and is adapted to be mounted on the rearward end of chute 114 at times. Bag 172 is of plastic construction and is provided with a plurality of perforations 178 formed therein. The rearward end 180 of bag 172 is sealed by any convenient means and the forward end 182 is open and is adapted to embrace the rearward end of chute 14 at times. Bag 172 is designed to be disposable and would be relatively inexpensive to manufacture.

The bag 154 is normally mounted on the mower as shown in FIGS. 10 and 11, and the bags 170 or 172 are inserted into or removed from bag 154 without removing bag 154 from the mower. Bags 170 and 172 are positioned within bag 154 in identical fashion.

To install bag 170 within bag 154, elastic band 164 and the lower end of bag 154 are moved out of groove 120 and downwardly onto the chute 114 (moved to the right, as viewed in FIG. 11). The open end 176 of bag 170 is then positioned over the groove 120 of chute 114, and the body of the bag 170 is stuffed into bag 154 through the opening 162 therein. The open end 176 of bag 170 is then held tightly in groove 120 with one hand, and the other hand is used to re-position the elastic band 164 and the lower end of bag 154 over the open end 176 of bag 170. As the elastic band 164 again tightens in groove 120, the open end 176 of bag 170, which is inside elastic band 164, is tightly held in groove 120 and is thus secured to the chute 114. This operation involves only a few seconds, and it can be accomplished when the mower is running, wherein the air exhaust from chute 114 serves to "inflate" bag 170. The bag 170 is removed by reversing the above described operation.

The relationship of the carrier bag 154 may be changed with respect to the lawnmower by simply varying the angle of repose of the arm 150 as previously described. Arm 150 may be disengaged from bracket 122 to conveniently rotate the insertion or removal of the inner bag within carrier bag 154 by simply causing pin 152 to be disengaged from slots 134 and 136. This disengagement may be accomplished by first lowering the forward end of arm 150 and then removing the same rearwardly out of slots 134 or pin 136 or slide 142 may be moved rearwardly to cause pin 152 to drop from behind shoulders 138 and 140.

In operation, bag 170 may be used if desired and the grass cuttings will be discharged thereinto from chute 114. The loose knitted construction of the fabric bag 170 permits the air being blown thereinto by the mower to escape therefrom and outwardly through the insert portion 160 and the open portion 152 of bag 154. When bag 170 is full, the bag is simply removed from within bag 154 and emptied and subsequently reinstalled within bag 154 as previously described. As previously stated, bag 170 is disposable and may be discarded upon being filled with the grass cuttings. The perforations 178 in the bag 172 permit the air being blown thereinto to escape therefrom.

The device of this invention can be used as an air rake for leaves or the like. When it is desired to so use the mower, the blades 89 and 89' are preferably removed from bar 53, and the bag 154 is removed from the mower in the manner described above. Because of the great "lift" created by the wings 59 and 61, the rotation of bar 53 effectively picks the leaves from the ground and deposits them in a windrow parallel to the path of travel of the mower. Repeated passes of the mower along the accumulated window will roll the window over laterally and add to the windrow any additional leaves that are between the mower and the windrow.

Thus, the collection bag structure illustrated in FIGS. 10, 11, 12, 13 and 14 provides for a unique but simple bag construction which permits the grass cuttings to be conveniently gathered and disposed of. Additionally, the two bag construction of the collection bag also substantially eliminates the possibility of a foreign object being ejected through the collection bag.

Thus, it can be seen that the invention accomplishes at least all of its stated objectives.

Some changes may be made in the construction and arrangement of my Combination Lawnmower and Leaf Rake without departing from the real spirit and purpose of my invention, and it is my intention to cover by my claims, any modified forms of structure or use of mechanical equivalents which may be reasonably included within their scope.

I claim:

1. In a rotary lawnmower device,
    a wheeled housing having a power means mounted thereon and a power shaft extending downwardly into said housing, said housing having a discharge opening formed therein,
    and a cutting blade means operatively secured to said shaft within said housing,
    said cutting blade means comprising a horizontal support means centrally secured to said power shaft and extending outwardly therefrom, and cutting blades at the outer ends of said support means,
    a liner positioned within said housing, said liner including a central hub portion positioned closely above said support means whereby only the upper ends of foreign objects will be struck by said support means, said liner having a peripheral channel portion formed outwardly of said central hub portion, said channel portion being disposed above the plane of said hub portion, said support means including an elongated horizontal portion having wing portions extending upwardly and outwardly from the opposite ends thereof, said wing portions being received within said channel portion, and cutting blade elements pivotally secured to said support means below said wing portions.

2. The device of claim 1 wherein each of said wing portions include a substantially vertical portion and a top portion extending outwardly therefrom, said top portions being curved so that the leading edge thereof is in a plane below that of the trailing edge thereof.

3. In a rotary lawnmower device,
a wheeled housing having a power means mounted thereon and a power shaft extending downwardly into said housing, said housing having a discharge opening formed therein, and a cutting blade means operatively secured to said shaft within said housing, said cutting blade means comprising a horizontal support means centrally secured to said power shaft and extending outwardly therefrom, and cutting blades at the outer ends of said support means, a liner positioned within said housing, said liner inincluding a central hub portion positioned closely above said support means whereby only the upper ends of foreign objects will be struck by said support means, said liner being provided with a plurality of protrusions extending therefrom which space said liner from said housing and permit vibration to pass from said housing to said liner thereby preventing the accumulation of grass cuttings on said liner.

References Cited

UNITED STATES PATENTS

| | | | |
|---|---|---|---|
| 2,969,634 | 1/1961 | Lannert | 56—295 |
| 3,080,697 | 3/1963 | Mauro | 56—295 |
| 3,104,510 | 9/1963 | Voist | 56—295 |
| 3,134,212 | 5/1964 | Gary | 56—25.4 |
| 3,191,371 | 6/1965 | Brewer | 56—295 |
| 3,220,170 | 11/1965 | Smith et al. | 56—295 |
| 3,320,732 | 5/1967 | Kirk | 56—295 |

ANTONIO F. GUIDA, Primary Examiner